(12) United States Patent
Maatta et al.

(10) Patent No.: US 7,580,726 B2
(45) Date of Patent: Aug. 25, 2009

(54) DUAL LEVEL SLIDE MECHANISM FOR EXTENDIBLE DEVICE HOUSINGS

(75) Inventors: Esa-Sakari Maatta, Viiala (FI); Tomas Ivaskevicius, Helsinki (FI); Mikko Ukonaho, Nokia (FI); Anssi Vanska, Helsinki (FI)

(73) Assignee: Nokia Corporation, Espoo (FI)

( * ) Notice: Subject to any disclaimer, the term of this patent is extended or adjusted under 35 U.S.C. 154(b) by 487 days.

(21) Appl. No.: 11/405,755

(22) Filed: Apr. 18, 2006

(65) Prior Publication Data

US 2007/0243897 A1  Oct. 18, 2007

(51) Int. Cl.
   *H04M 1/00* (2006.01)
(52) U.S. Cl. .............. 455/550.1; 455/90.3; 455/566; 455/575.1; 455/575.4; 455/557
(58) Field of Classification Search .............. 455/550.1, 455/90.3, 566, 575.1, 575.4, 557
   See application file for complete search history.

(56) References Cited

U.S. PATENT DOCUMENTS

| | | | |
|---|---|---|---|
| 4,794,779 A * | 1/1989 | Schweitzer | 72/390.4 |
| 6,244,491 B1 * | 6/2001 | Kandasamy et al. | 227/134 |
| 7,065,835 B2 * | 6/2006 | Kuramochi | 16/357 |
| 2004/0202316 A1 * | 10/2004 | Abe et al. | 379/451 |
| 2005/0013102 A1 * | 1/2005 | Poulsen | 361/683 |
| 2005/0190291 A1 | 9/2005 | Kota et al. | |
| 2005/0245297 A1 | 11/2005 | Lee et al. | |
| 2006/0128449 A1 | 6/2006 | Park | |

FOREIGN PATENT DOCUMENTS

| | | |
|---|---|---|
| EP | 1804468 | 7/2007 |
| KR | 100662442 | 12/2006 |

* cited by examiner

*Primary Examiner*—Joseph H Feild
*Assistant Examiner*—Huy D Nguyen
(74) *Attorney, Agent, or Firm*—Hollingsworth & Funk, LLC

(57) ABSTRACT

An extendible mobile electronic device with a housing having a first housing element comprising a first front surface and a first rear surface and a second housing element, comprising a second front surface and a second rear surface. Said first housing element, and said second housing element are extensibly supported to each other, such that said first and second housing elements can adopt a retracted position and an extended position with respect to each other. In said retracted position said first housing element and said second housing element are located substantially on top of each other, said first rear surface conformingly adjoining said second front surface. In said extended position said first housing element is displaced with respect to said second housing element and at least a section of said second front surface is adjoining said and flushing with said first front surface.

17 Claims, 9 Drawing Sheets

Fig. 6a                    Fig. 6b

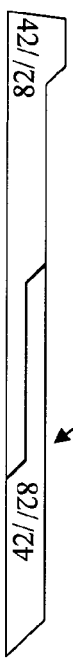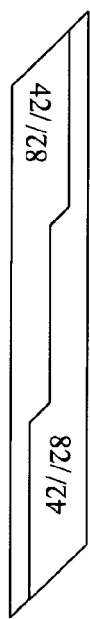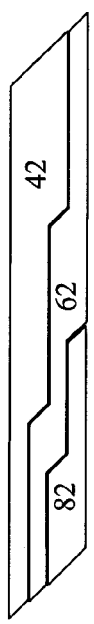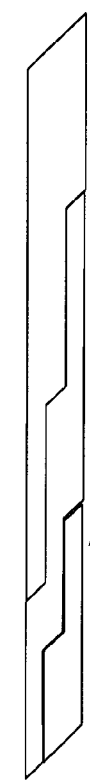
Fig. 7a        Fig. 7b        Fig. 7c

DUAL LEVEL SLIDE MECHANISM FOR EXTENDIBLE DEVICE HOUSINGS

FIELD OF THE INVENTION

The present invention relates to the field of mobile devices. In particularly, the present invention relates to the field of in general extendible devices, especially applicable to slidable devices and/or mobile/portable (electronic) devices.

BACKGROUND

Slidable mobile or portable electronic devices such as consumer electronic (CE) devices, mobile telephones, palmtops, and communicators are well known in the art and are available from a huge number of different manufacturers.

Especially, in the technical field of cellular telephones two main types of extendible devices are available, the flip cellular telephones, clamshell cellular telephones, or slidable cellular telephones such as the Nokia's Models N71 and N80. Sliding phones like the Nokia's Model N80 have typically a large display and an ITU-T keypad that becomes accessible when the front part of the two-piece housing is displaced upwards (forwards). Further form factors and extension mechanisms are also known in the technical field of cellular telephones. Exemplarily, rotatable/pivotable mechanisms such as implemented with Nokia's Model 7370 and mechanisms combining one or more of the above mentioned mechanisms e.g. Nokia's Model N90 have been developed.

However, the known approaches and designs of slidable mobile devices typically having a two-piece housing suffer from a common disadvantage in view of usability. The keypads and the display are arranged in different and typically substantially parallel planes due to their arrangement with different parts of the two-piece housing. Conventionally, keys destined for navigation through the user interface such as a multi-directional switch or joystick and/or keys for initiating/answering and/or ending a call are arranged with the part of the housing which comprises the display, whereas the more space requiring ITU-T keypad is arranged with the other part of the housing. For instance during inputting a telephone number and initiating the call set-up, a user has to actuate one or more keys of the ITU-T keypad as well as one or more keys arranged at the housing part comprising the display. Due to the thickness of the housing part comprising the display, the user may find the different levels at which the keys are arranged irritating or annoying.

SUMMARY OF THE INVENTION

It is an object of the present invention to improve the operability of slidable mobile devices and to enhance the usability of such slidable mobile devices.

An object of the invention is solved by the features of the accompanying independent claim 1.

According to an aspect of the present invention, an extendible mobile or portable electronic device, in particular a portable consumer electronic (CE) device, is provided, which comprises inter alia a device housing, which has at least a first housing element with a first front surface and a first rear surface and a second housing element with a second front surface and a second rear surface, and one or more level slide mechanisms.

Each of the level slide mechanisms comprises inter alia first and second frame elements, each of which has a guideway element, and first and second lever elements, one end of each of which engages pivotably with one of the first and second frame elements and the other end of each of which engages pivotably and slidably with the guideway element of the other one of the first and second frame elements.

The first frame element is provided for being attached to, affixed to, or mounted at one of the first and second housing elements. The second frame element is provided for being attached to, affixed to, or mounted at the other one of the first and second housing elements. The first housing element and the second housing element are extensibly supported by the level slide mechanisms to each other, such that the first and second housing elements can adopt a retracted configuration and an extended configuration with respect to each other.

According to an embodiment of the present invention, a conversion of the device housing from the retracted configuration to the extended configuration comprises a first movement of the housing elements substantially in parallel to each other and a second shift movement of the housing elements approaching each other.

According to an embodiment of the present invention, the lever elements are enabled for sliding in guidance by the guideway elements such that the housing elements is enabled for moving against each other in a direction of extension.

According to an embodiment of the present invention, the lever elements are enabled for pivoting in relation to the first and second frame elements to allow the housing elements to approach each other by the shifting movement. In particular, orientations of the housing elements are substantially maintained in relation to each other during the shifting movement.

According to an embodiment of the present invention, an orientation of the guideway elements defines a direction of extension of the extendible device housing. This means that the orientation of the guideway elements corresponds substantially to the direction of extension. The guideway elements are correspondingly oriented in accordance with the extension direction of the extendible device housing.

According to an embodiment of the present invention, one of the level slide mechanisms is arranged at a side of the device housing and another one of the level slide mechanisms is arranged at an opposite side of the device housing. The side and opposite side of the device housing should be defined in relation to a direction of extension. The level slide mechanisms may be arranged internally and/or externally with the device housing.

According to an embodiment of the present invention, in the retracted configuration, the first housing element and the second housing element are located substantially on top of each other. The first rear surface conformingly adjoins the second front surface.

According to an embodiment of the present invention, in the extended configuration, the first housing element is displaced with respect to the second housing element. At least a section of the second front surface should adjoin at least a section of the second front surface, i.e. the first rear surface should partially adjoin the second front surface. In particular, the first rear surface conformingly adjoins the second front surface.

According to an embodiment of the present invention, in the extended configuration, the first front surface flush with the second front face. This means that the exposed front surfaces of the first and second housing elements should be displaced in a common plane in space and the term "exposure" should be understood herein as exposed to the external to exterior of the device. Moreover, the first and second housing elements are arranged at the same level, substantially.

According to an embodiment of the present invention, the first and second frame elements are substantially axial symmetrical to each other. The axial symmetry should be given to an axis substantially perpendicular to the extension direction and/or a surface of the frame elements.

According to an embodiment of the present invention, the level slide mechanism further comprises first and second counterpart frame elements, which are arranged with the first and second frame elements to interpose the lever elements between the first and second frame elements and the first and second counterpart frame elements. The first frame element and the first counterpart frame element may be arranged in conforming opposition to each other. Analogously, The second frame element and the second counterpart frame element may be arranged in conforming opposition to each other.

According to an embodiment of the present invention, the first and second counterpart frame elements each has a guideway element. One end of each of the first and second lever elements engages pivotably with one of the first and second counterpart frame elements and the other end of each of the first and second lever elements engages pivotably and slidably with the guideway element of the other one of the first and second counterpart frame elements.

According to an embodiment of the present invention, the first rear and the second front surfaces have a stepped configuration.

According to an embodiment of the present invention, the device further comprises a display, which is arranged on the first front surface, a user input interface element, which is arranged on the section of the second front surface, and processing means, which is connected to the display and to user input interface element.

According to an embodiment of the present invention, the device further comprises one or more applications operable with said device; and a sensor for detecting said configuration of said device housing. The one or more applications are reactive to a signal supplied by said sensor. The signal is indicative of the housing configuration.

According to an embodiment of the present invention, the device is further provided with a pawl for locking the housing in the retracted and/or in the extended configuration.

According to an embodiment of the present invention, the device further comprises a cellular telephone module enabling for cellular communications.

BRIEF DESCRIPTION OF THE DRAWINGS

In the drawings,

FIG. 6a to 6c show different schematic views of a device having a landscape form factor according to an embodiment of the present invention, which housing configuration comprises three housing elements, depicted in a retracted, partially (one-sided) extended, and a substantially fully (two-sided) extended configurations; and FIG. 7a to 7c show schematic side views of three different embodiments of mobile electronic terminal devices in retracted configurations as well as extended configurations.

DETAILED EMBODIMENTS OF THE INVENTION

Figure 1A:
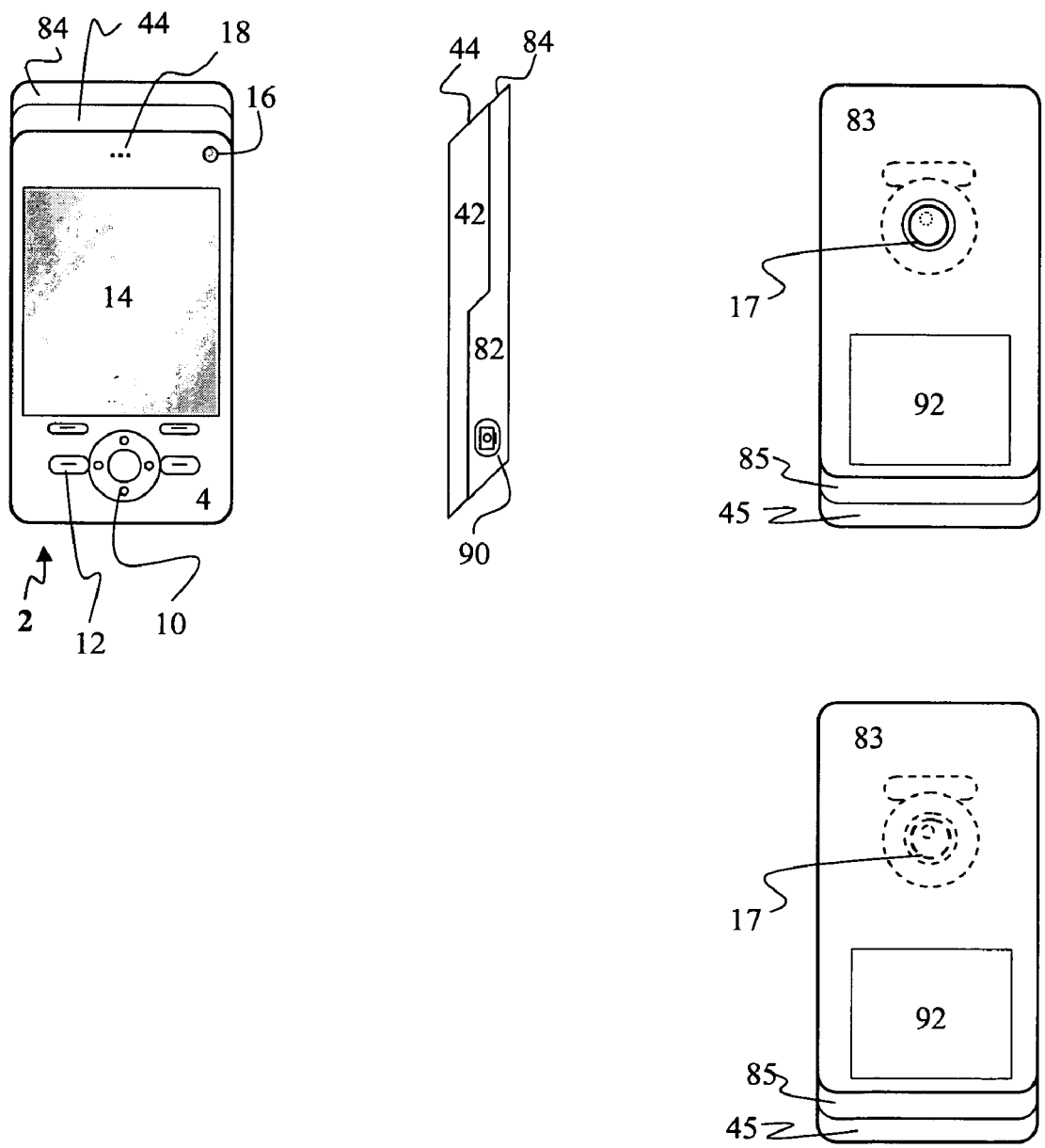
FIG. 1a depicts schematic plan views of a device according to an embodiment of the present invention with two housing elements depicted in a retracted (housing) configuration.

In the detailed description, which follows, same or identical components have been given the same reference numerals, regardless of whether they are shown in different embodiments of the present invention. In order to clearly and concisely illustrate the present invention, the drawings may not necessarily be to scale and certain features may be shown in somewhat schematic form. Especially in embodiments in which both housing elements may be used as first or second housing elements both housing elements are provided with reference signs.

Figure 1B:
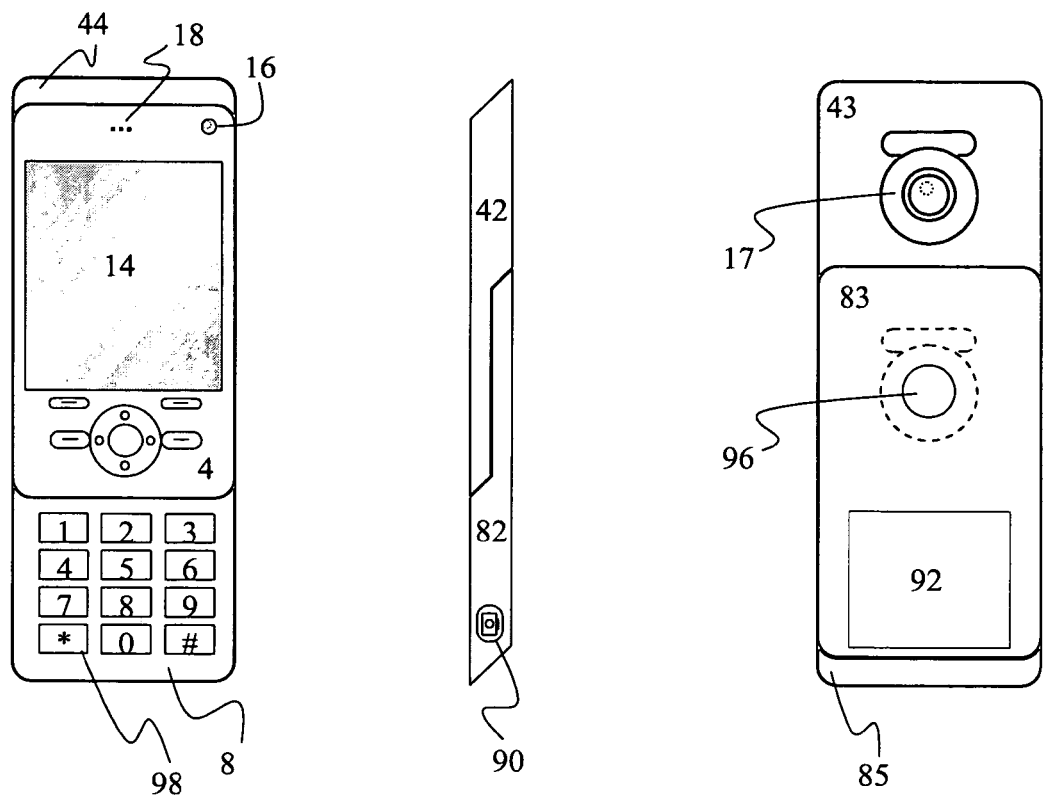
FIG. 1b shows schematic plan views of the embodiment of FIG. 1a depicted in an extended (housing) configuration.

FIGS. 1a and 1b show an embodiment of an extendible mobile electronic device 2 of the present invention in different plan views. The depicted extendible mobile electronic device 2 is embodied as an extendible cellular telephone. The invention should be understood as not being limited to mobile electronic device having any specific functionality. Each figure comprises several individual views, which are from left to right in FIG. 1a: front plan view, side plan view, and rear plan view (two embodiments in stacked alignment), wherein each view illustrates the device 2 in a substantially retracted position. The individual views of FIG. 1b are from left to right: front plan view, side plan view, and rear plan view, wherein each individual view illustrates the device 2 in the substantially extended position.

According to the embodiments depicted in FIGS. 1a and 1b, the device 2 has a two-piece housing arrangement, which comprises a first housing element 4 and a second housing element 8. Moreover, the embodiments depicted in FIGS. 1a and 1b illustrate the housing elements 4 and 8 arranged in a retracted position and retracted (housing) configuration, respectively. The retracted (housing) configuration may be distinguished in that the first housing element 4 is located substantially on the top of the second housing element 8.

In FIG. 1a, the device 2 embodied as a cellular telephone comprises a substantially large display 14, a few basic control keys (such as a 4-way-navigation button 10 and menu keys 12), a small video phone camera 16 at top position at the right side, and an earpiece 18 in a centered position arranged over the display 14. In the front view, the first housing element 4 is substantially visible, whereas the second housing element 8 is substantially covered by the first housing element 4 (but not necessarily completely). At the top of the device 2 (in respect to the conventional position of the device 2, in which the device 2 is intended for being handled by a user), inclined top faces 44 and 84 of the device 2 and a parting line between the housing elements 4, 8 may be at least partly visible. The inclined shaped top faces 44 and 84 of the first and second housing elements 4, 8 are illustratively indicated at the top of the front view.

The parallelogram shaped overall structure depicted at a middle position of FIG. 1a illustrates a side view, for instance the right hand side view, of the device 2 provided with an optional housing unlocking button (or a shutter release button) 90. The parting line between a side face 42 of the first housing element 4 and a side face 82 of the second housing element 8 is illustrated and divides this embodiment into substantially similar shaped housing elements. The housing elements 4, 8 are shaped in cross section such to enable a substantially conforming arrangement of the adjoining faces of the housing elements being arranged in retracted housing configuration. The first and the second housing elements 4, 8 substantially overlap each other having the conformingly adjoining arrangement. Is it also envisaged to implement an unlocking key e.g. at the left hand side of the device (not depicted). Additionally, the inclined shaping of the inclined top faces 44 and 84 of the first and second housing elements 4, 8 as well as the inclined bottom faces 45 and 85 of the first and second housing elements 4, 8 are depicted and indicated.

The drawing shown in FIG. 1a at right hand side depicts rear views of two embodiments of the device 2. The rear view of the embodiment of the device 2 depicted at upper position of FIG. 1a shows an aperture 96 for a lens of an optional camera module 17 in the first housing element 4 that can be seen through the aperture 96 in the second housing element 8 in the rear view 83.

The rear view of the embodiment of the device 2 shown at lower position of FIG. 1a depicts no aperture for a lens. The optional camera module 17 in the first housing element 4 is merely indicated by the means of interrupted lines. In the rear views of the embodiments, a cover of a battery compartment 92 (SIM compartment and/or memory card compartment) is additionally indicated by the small rectangle in the lower section of the rear view.

The left-hand side drawing of FIG. 1b shows a front view of the device 2 in a substantially extended position or in a substantially extended (housing) configuration, wherein at the upper part the inclined top part of the second housing element 8 is not longer visible and at the lower housing section the second housing element 8 comprising an ITU-T keypad 98 is visible.

In substantially extended (housing) configuration, the first housing element 4 is displaces with respect to the second housing element and the second housing element is partly uncovered from the first housing element 4.

The drawing positioned at the center of FIG. 1b shows a parallelogram shaped overall structure of the device 2 in right-hand side view, wherein the housing elements 4, 8 are in substantially extended position and are arranged in substantially extended housing configuration, respectively. The optional unlocking button 90 is arranged at the side face 82 of the second housing element 8. The first housing element 4 and the second housing element 8 partially overlap each other, wherein the adjoining faces of the housing elements conform and the front face of the first housing element 4 and the uncovered front face of the second housing element 8 flush with each other. In the substantially extended position, the device 2 has a shallower but more extended configuration.

The right-hand side drawing of FIG. 1b shows the rear view of the device 2 in the substantially extended position/(housing) configuration. In the substantially extended position, the lens of the camera module 17 is visible and operable (in both embodiments with or without said aperture 96 in the second housing element 8 in rear view 83).

The device 2 according to an embodiment of the invention as depicted in FIGS. 1a and 1b has a "two step"-configuration as both the first and the second housing elements 4 and 8 correspond to a two-step stepladder or a two-step library step, which can be placed on top of each other with the steps facing.

Figure 1C:
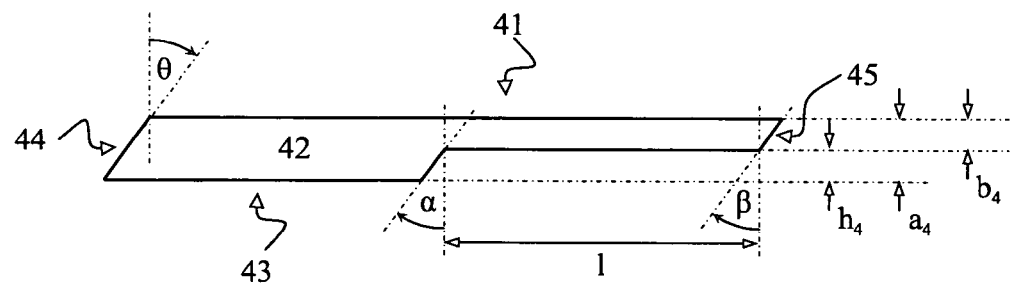
FIG. 1c shows separated schematic plan views of housing elements according to an embodiment of the present invention.
Figure 1C:
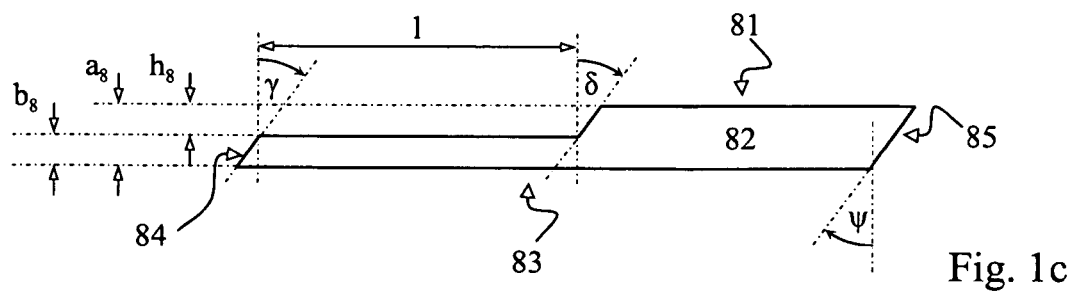

With reference to FIG. 1c, principle measures and shapes of the housing elements according to an embodiment of the invention should be illustrated. FIG. 1c illustratively depicts a side view of the housing elements 4 and 8 of the device 2 in a separated arrangement but in analogy with the side view illustrations shown FIGS. 1a and 1b and described above with reference thereto. In more detail, the side face 42 of the first housing element 4 is illustrated and indicated as well as the side face 82 of the second housing element 8 is illustrated and indicated. Although the illustrations referred to in the description of the present invention comprises side views of one or more embodiment, those skilled in the art will appreciate that any cross sections may show substantially same shapes, when the cross sections are obtained form cuts substantially perpendicular to the front surface of the device 2 and/or parallel to the side faces of the device 2. In accordance with the embodiment illustrated, each of the font face 86 of the second housing element 8 and the rear face 43 of the first housing element 4 has a step in accordance with the aforementioned "two step"-configuration. The steps at the font face 86 and the rear face 43 have step faces with inclination angles $\delta$ and $\alpha$, respectively, in relation to the respective face. Moreover, each of the top faces 44, 84 of the first and second housing element 8 has an inclined shape, respectively. Likewise, each of the bottom faces 45 and 85 of the first housing element 4 and second housing element 8 has an inclined shape, respectively, wherein the inclined shape of the bottom face 45 of the first housing element 4 should be defined by an inclination angle $\beta$ and the inclined shape of the top face 84 of the second housing element 8 should be defined by an inclination angle $\gamma$ (the inclination angles should be defined in relation to the respective face of the housing element). For the sake of completeness, the inclined shape of the top face 44 of the first housing element 4 should be defined by an inclination angle $\theta$ and the inclined shape of the bottom face 85 of the second housing element 8 should be defined by an inclination angle $\psi$.

Furthermore, each of the housing elements 4 and 8 has substantially a first thickness $a_4$ and $a_8$ as well as a second thickness $b_4$ and $b_8$. According to the embodiment shown in FIG. 1c, the first housing element 4 has a first thickness $a_4$ at the top part and a second thickness $b_4$ at the bottom part. Correspondingly, the step at the rear face 43 of the first housing element 4 has a height $h_4$, wherein $h_4=a_4-b_4$. The second housing element 8 has a first thickness $a_8$ at the bottom part and a second thickness $b_8$ at the top part, wherein the step at the front face 81 of the second housing element 8 has a height $h_8$, wherein $h_8=a_8-b_8$. According to the shown embodiment, the thicknesses b should be less than the thicknesses a.

Without being limited thereto, the sum of the thicknesses $a_4$ and $b_8$ should be further equal to the sum of the thicknesses $a_8$ and $b_4$, wherein the sum thereof is equal to the total thickness ($h_{ret}$) of the device 2 in retracted position. The same total thickness $h_{ret}=a_4+b_8=a_8+b_4$ ensures that the rear face 43 and the front face 81 of the respective housing elements 4 and 8 are in contact when the device 2 is in retracted position.

Without being limited thereto, the step heights $h_4$ and $h_8$ of the steps at the font face 86 and the rear face 43 should be equal to the corresponding thicknesses $b_8$ and $b_4$ to enable the front faces 41 and 81 lying in a substantially same plane. It should be noted that the total height ($h_{ext}$) of the device 2 in extended position is equal to the sum of the thicknesses $b_4$ and $b_8$, the thickness $a_4$, and the thickness $a_8$, respectively.

Without being limited thereto when the device 2 is in retracted position, a seamless fitting of the first housing element 4 and the second housing element 8 may be obtained by selecting a common inclination angle of the steps, i.e. inclination angle α equal to inclination angle δ.

Without being limited thereto when the device 2 is in extended position, a seamless fitting of the first housing element 4 and the second housing element 8 may be obtained by selecting a common inclination angle of the top face 84 of the second housing element 8 and the bottom face 45 of the first housing element 4, i.e. inclination angle γ equal to inclination angle β.

The inclination angles mentioned above are defined in relation to a middle plane of the device 2 but may also be defined in relation to any other suitable plane e.g. a plane defined by a vector describing the direction of extension (which may correspond to the direction of a first movement) and one or the faces of the first and second housing elements 4, 8, which are arranged substantially conformingly and in opposition to each other in retracted position of the device 2, respectively.

Without being limited thereto, the parts of the housing elements 4, 8, which adjoin and (and/or may be adjacent) and cover each other in extended housing configuration should have the same length l.

It should be noted that in general, but not being limited thereto, the housing elements may have a rotation symmetrical or axial symmetrical shape in relation to a transversal axis perpendicular to the side faces illustrated and a rotation of 180° thereabout, respectively.

Figure 2A:
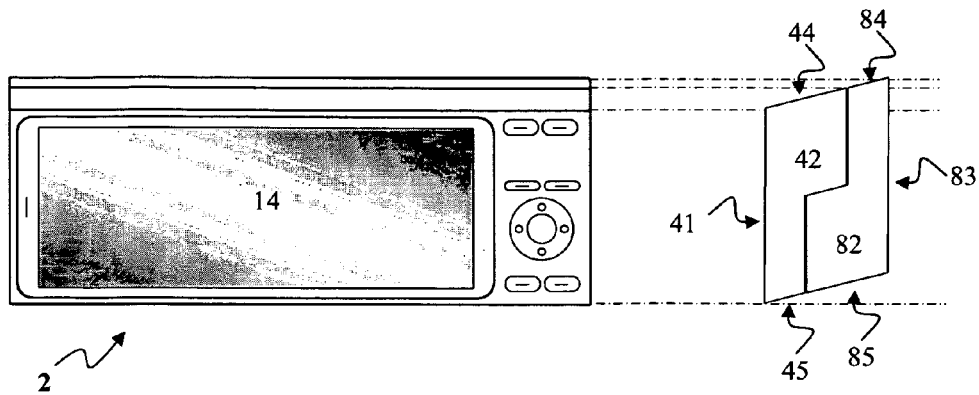
FIGS. 2a and 2b depicts schematic plan views of a device according to an embodiment of the present invention with two housing elements depicted in a retracted (housing) configuration and an extended (housing) configuration, respectively.
Figure 2B:
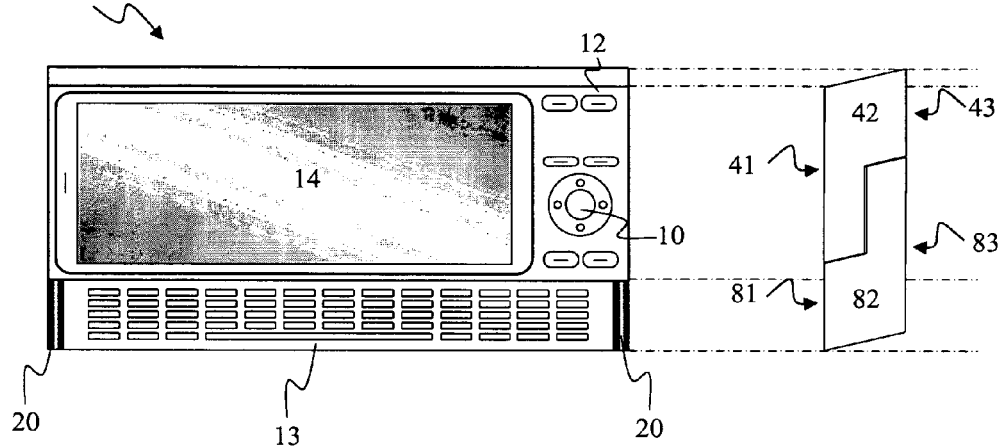

The illustration shown in the above describe figures refer to the portrait form factor of the overall device housing. Nevertheless, it should be noted that the invention is not limited to any specific form factor of the device housing. With reference to FIGS. 2a and 2b, a device having landscape form factor is presented. FIGS. 2a and 2b illustrate a communicator style mobile electronic device according to an embodiment of the present invention having such a landscape form factor. The first housing element 4 comprises a substantially large display 14 and a selection of basic control keys (such as a 4-way navigation button 10 and/or menu keys 12). In the front view, the first housing element 4 is substantially visible, whereas the second housing element 8 is substantially covered by the first housing element 4 (but not necessarily completely). The side view depicted additionally in FIG. 2a illustrates a parallelogram shaped overall structure, wherein the side view for instance represents a right-hand side view of the device 2. It should be noted that any cross section view through the device 2 has substantially the same schematic structure, wherein such a cross section may be obtainable from a plane being substantially parallel to the side faces of the device 2.

The parting line between a side face 42 of the first housing element 4 and a side face 82 of the second housing element is illustrated and divides this embodiment into substantially similar shaped housing elements. The housing elements are shaped in cross section to enable a substantially conforming arrangement of the adjoining faces of the housing elements being arranged in retracted housing configuration. The first and the second housing elements 4, 8 substantially overlap each other having the conformingly adjoining arrangement. Is it also envisaged to implement an optional unlocking key e.g. at the left hand side of the device (not depicted). Additionally, the inclined shaping of the inclined top faces 44 and 84 of the first and second housing elements 4, 8 as well as the inclined bottom faces 45 and 85 of the first and second housing elements 4, 8 are depicted and indicated.

The left-hand side illustration of FIG. 2b shows a front view of the device 2 in a substantially extended position and in a substantially extended (housing) configuration, respectively, wherein at the upper part the inclined top face 84 of the second housing element 8 is not longer visible and at the lower housing section the second housing element 8 comprising a keyboard 13 and/or an arrangement of keys is visible. In substantially extended (housing) configuration, the first housing element 4 is displaced with respect to the second housing element 8 and the second housing element 8 is partly uncovered from the first housing element 4.

The right-hand side illustration of FIG. 2b shows a parallelogram shaped overall structure of the device 2 in side view, wherein the housing elements 4, 8 are arranged in substantially extended position and in substantially extended housing configuration, respectively. The optional unlocking button 90 may be arranged at the side face 82 of the second housing element 8. The first housing element 4 and the second housing element 8 partially overlap each other, wherein the adjoining faces of the housing elements 4, 8 conform to each other and the front face 41 of the first housing element 4 and the uncovered front face 81 of the second housing element 8 flush with each other. In the substantially extended position, the device 2 has a shallower but more extended configuration.

Likewise, the device 2 according to an embodiment of the invention as depicted in FIGS. 2a and 2b has a "two step"-configuration as both the first and the second housing elements 4 and 8 correspond to a two-step stepladder or a two-step library step, which can be placed on top of each other with the steps facing.

Figure 2C:
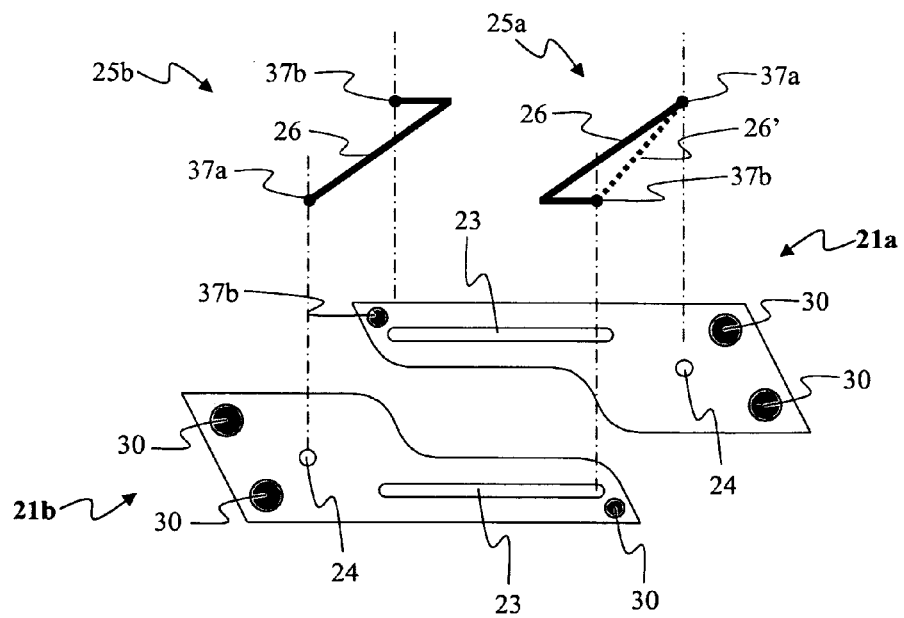
FIG. 2c depicts schematically components of a dual level slide mechanism according to an embodiment of the invention.

In accordance with an embodiment of the invention, the device 2 comprises a dual level slide mechanisms 20 arranged at the side faces of the device 2 to enable the above illustrated conversion of the housing configuration. A detailed description of the dual level slide mechanisms 20 according to an embodiment of the present invention is schematically depicted in FIG. 2c. A more detailed embodiment thereof will be described below with reference to FIG. 4a. The schematic illustration of FIG. 2c depicts structural elements in a plan view corresponding to the side view of the device 2.

The embodiment of the dual level slide mechanisms 20 comprises two frame elements 21a and 21b, each of which has a guideway element 23, a joint counterpart element 24, and one or more fixture elements 30, an two lever elements (or rocker arm elements) 25a, 25b, each of which has a first joint element 37a and a second element 37b arranged at the respective end of the lever element 25a and the lever element 25b, respectively. The first joint element 37a and a second element 37b of each lever element 25a and 25 are connected to each other by the means of a joining bar element 26.

In analogy with the cross sectional shape of housing elements 4, 8, the frame elements 21a and 21b have likewise a "two step"-configuration as both the first and the frame elements 21a and 21b correspond to a two-step stepladder or a two-step library step, which can be displaced on top of each other with the steps facing. In general, the description given above with reference to FIG. 1c applies analogously to general structure of the shape of the frame elements 21a and 21b. Those skilled in the art will understand on the basis of the description of the present invention to transfer the teaching relating to the structural measures and shapes to those of the frame elements. According to the embodiment illustrated in FIG. 1c, the frame elements 21a and 21b have substantially a rotation symmetrical or axial symmetrical structure in relation to an axis perpendicular to the extension direction and a rotation of 180° thereabout, respectively.

The first joint element 37*a* of the first lever element 25*a* is provided for being operatively arranged with the joint counterpart element 24 of the first frame element 21*a*. The first lever element 25*a* arranged with the first frame element 21*a*, i.e. the first joint element 37*a* of the first lever element 25*a* pivotably engages with the joint counterpart element 24 of the first frame element 24*a*, is enabled to pivot about an axis substantially perpendicular to the surface of the first frame element 21*a*, i.e. an axis substantially perpendicular to the extension direction. The second joint element 37*b* of the first lever element 25*a* is provided for being operatively engaged with the guideway element 23 of the second frame element 21*b*. The first lever element 25*a* arranged with the second frame element 21*b*, i.e. second joint element 37*b* of the first lever element 25*a* engages slidably as well as pivotably with the guideway element 23 of the second frame element 21*b*, is enabled to pivot about an axis perpendicular to the surface of the second frame element 21*b* and to slide in relation thereto guided by the guideway element 23 thereof, which is intended for being oriented into extension direction.

The second first lever element 25*b* is arranged analogously. The first joint element 37*a* of the second lever element 25*b* is provided for being operatively arranged with the joint counterpart element 24 of the second frame element 21*b*. The second lever element 25*b* arranged with the second frame element 21*b*, i.e. the first joint element 37*a* of the second lever element 25*b* pivotably engages with the joint counterpart element 24 of the second frame element 24*b*, is enabled to pivot about an axis substantially perpendicular to the surface of the second frame element 21*b*, i.e. an axis substantially perpendicular to the extension direction. The second joint element 37*b* of the second lever element 25*b* is provided for being operatively engaged with the guideway element 23 of the first frame element 21*a*. The second lever element 25*b* arranged with the first frame element 21*a*, i.e. second joint element 37*b* of the second lever element 25*b* engages slidably as well as pivotably with the guideway element 23 of the first frame element 21*a*, is enabled to pivot about an axis perpendicular to the surface of the first frame element 21*a* and to slide in relation thereto guided by the guideway element 23 thereof, which is intended for being oriented into extension direction.

The lever elements 25*a* and 25*b* according to an embodiment of the invention may have a bent shape as illustrated by the means of the schematically depicted joining bar element 26. However, it should be noted that such a bent shape is not necessarily required, but the lever elements 25*a* and 25*b* may be also embodiment as straight bars, substantially. The effective operating lever 26' is indicated with respect to lever element 25*a*.

Figure 4A:
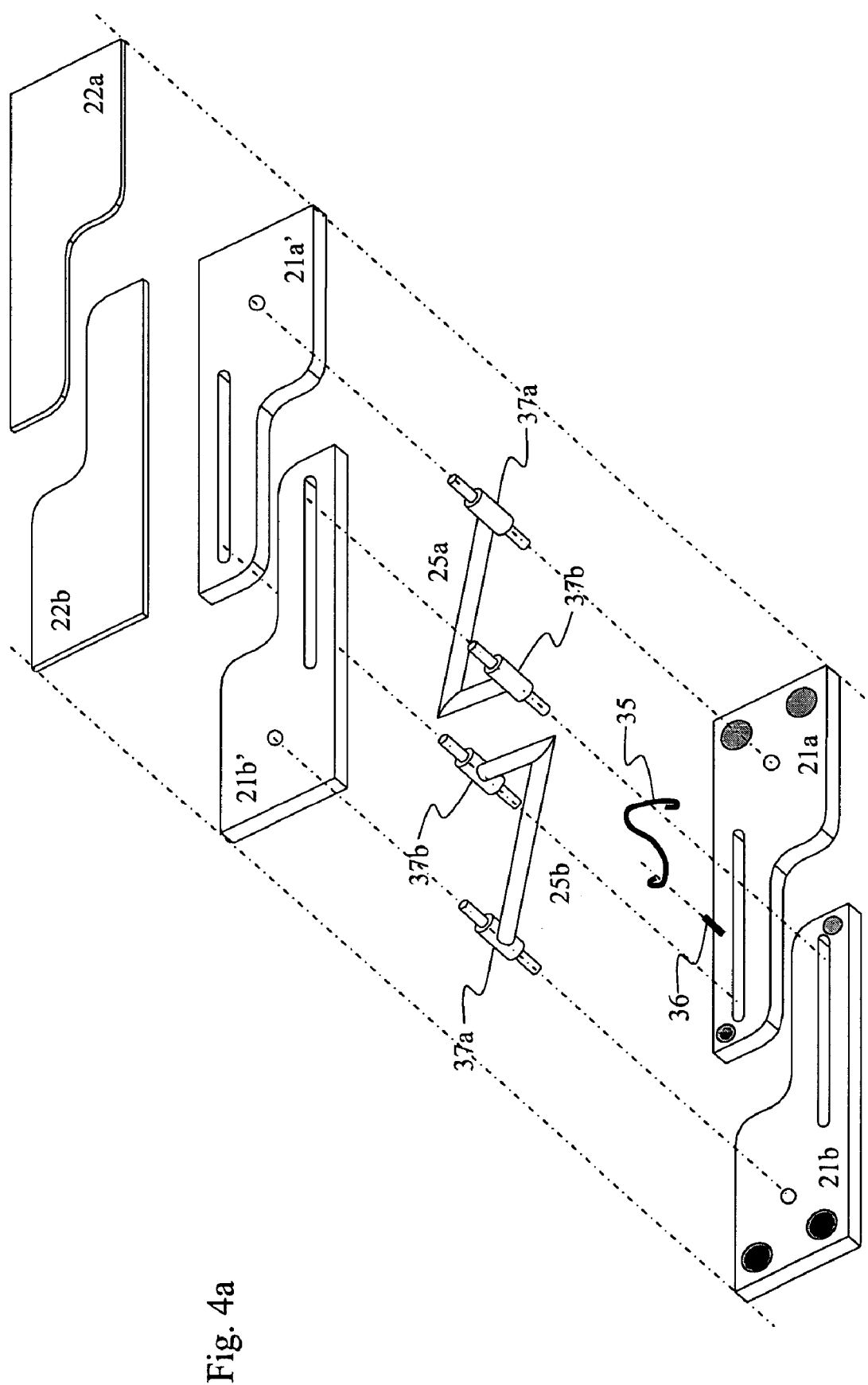
FIG. 4a depicts schematically components of a dual level slide mechanism according to an embodiment of the invention in a perspective view.

According to an embodiment of the invention, fixture elements 30 may be provided, which enable mounting of respective corresponding counterpart frame elements such that the lever elements 25*a*, 25*b* are interposed between frame elements. Reference should be given to FIG. 4*a*, which illustrates a perspective schematic view of such a frame element arrangement according to an embodiment of the present invention. The fixture elements 30 may comprise, but not being limited thereto, one or more protrusions, e.g. cylindrical protrusions, which engage into counterpart recesses, e.g. cylindrical recesses, each provided at a frame element and the counterpart frame element thereof. It should be noted that such counterpart frame elements have a substantially mirror symmetrical structure (with the exception of the structure of the fixture elements 30 provided to engage with each other).

In the following, the operation of the dual level slide mechanism 20 allowing the housing of the device 2 to be converted from a retracted housing configuration into an extended housing configuration and vice versa should be illustratively described. The illustrations of the FIG. 3*a* to 3*e*, which will be described below, show on the left-side hand a schematic depiction of the dual level slide mechanism 20 and on the right-hand side a schematic plan front view of the device 2 having a housing configuration corresponding to the illustrated operation state of the dual level slide mechanism 20.

FIGS. 3*a* to 3*e* show side views of the embodiment of the present invention illustrated in FIGS. 2*a* and 2*c*, which side views depict configurations of the housing elements 4, 8 and aforementioned the dual level slide mechanism 20, respectively. The schematic snap-shot views represents different housing configurations beginning from retracted housing configuration and ending at extended housing configuration including snap-shot views in-between those housing configurations obtainable during conversion from one configuration into the other one. The conversion from retracted into extended housing configuration is operable with a movement of the first and second housing elements 4, 8 against each other.

The movement of the housing elements is depicted by the means of snap-shot illustrations of the housing configuration, wherein the conversion may be described with respect to the movement of the first housing element 4. Those skilled in the art will appreciate that the reference point selected is not intended as being limited thereto. The movement may be divided into substantially two basic movements including a first movement during a first phase and a second movement during a second phase. The movements are preferably successive. This means that, when converting the device 2 starting from retracted configuration (as illustratively shown in FIG. 2*a*) and ending at the extended configuration (as illustratively shown in FIG. 2*b*), the first movement may be distinguished by a movement substantially parallel to the direction, in which the housing configuration is extended, where the confronting adjoining faces of the housing elements 4, 8 slide against other and the second movement may be distinguished by a movement bringing together the confronting but spacious separated housing elements 4, 8, again. In accordance with the embodiment shown in FIG. 1*c*, where the front and rear faces of the housing elements are substantially parallel to each other, the first movement might be substantially linear, when the adjoining faces of the housing slide against each other.

The direction of the second movement may be substantially guided by the bottom face 45 and the corresponding step face of the step at the front face 81, which (mutually) confront each other, as well as the bottom face 84 and the corresponding step face of the step at the rear face 43, which (mutually) confront each other, according to an embodiment of the present invention. According to this embodiment, the second movement may be substantially parallel to inclined faces 45, 85 and the step faces, respectively and hence may be substantially linear without being limited thereto.

Moreover, when converting the device 2 starting from extended configuration (as illustratively shown in FIG. 1*b*) and ending at retracted configuration (as illustratively shown in FIG. 1*a*), the aforementioned two basic movements are performed in reverse order and in reverse direction, respectively.

Figure 3A:
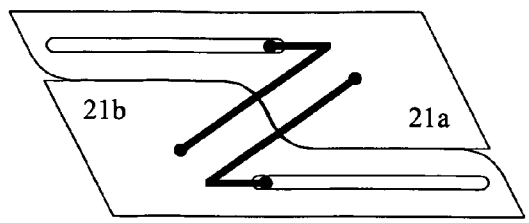
FIGS. 3a and 3e show schematic snap-shots plan views of a dual level slide mechanism during operation according to an embodiment of the present invention.
Figure 3A:

FIG. 3*a* illustratively depicts device 2 in retracted configuration in analogy to the side view illustrated in FIGS. 1*a* and 2*a* and described above with reference thereto. The first frame element 21a is substantially disposed in a stack arrangement over the second frame element 21b. The steps present in the shape structure of the frame elements 21a, 21b are in adjoining conformity. The rear faces and the front faces of the frame elements are in conformingly adjoining arrangement.

Figure 3B:
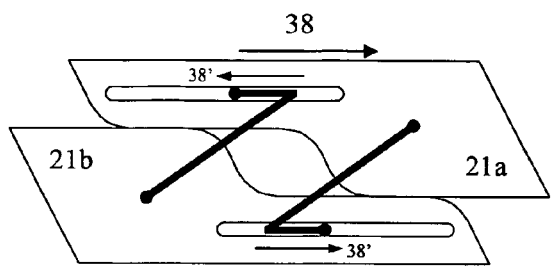
Figure 3B:

With regard to FIG. 3b, the first and second frame elements 21a and 21b are slidably arranged and connected to each other such that the elements 21a, 21b can be moved, shifted, or slid against each other, for instance upon application of an externally exerted force engaging at the housing elements and exerting a separating force in extension direction. Assuming the second frame element 21b (or the second housing element 8, at which the second frame element 21b is mounted) as reference, the first frame element 21a is slidable in the extension direction 38 to the housing of the device 2. It should be noted that the extension direction should be defined as that direction, towards which the housing configuration comprising the two housing elements extents, when the configuration is converted from retracted configuration to extended configuration.

This movement should be obtained by the means of the lever elements 25a, 25b, which slide by the means of the joint elements 37b thereof in relation to of the frame elements 21a and 21b and in guidance by the guideway element 23 thereof. When the housing elements 4 and 8 are slid about a length l' against each other, each of the joint elements 37a of the lever elements 25a, 25b is slid about the same the length l' in guidance by the guideway elements 23 in relation to the respective frame element 21a and 21b, respectively.

Figure 3C:
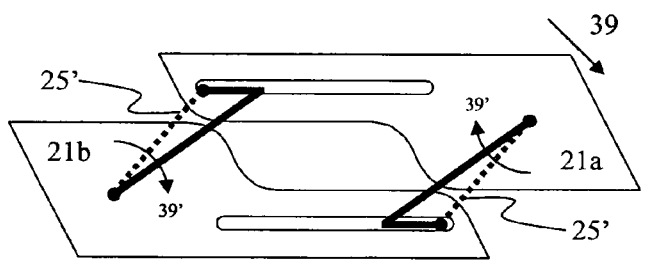
Figure 3C:
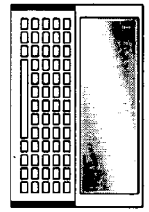

With reference to FIG. 3c, the sliding movement, i.e. the first movement 38, is continued upon application of the (externally exerted and separating) force and ends when the device 2 has substantially reached the maximum extension expect the length contribution of the subsequent second (approaching) movement. At the end position of the of the first movement, the parts of the frame elements 21a and 21b having less height (i.e. the parts having the heights b4 and b8, respectively, according to the embodiment illustrated) are arranged in a substantially overlapping arrangement but there parts are not in contact up to now. The second movement, where the first joint elements 37a of the lever elements 25a, 25b may substantially perform a pivoting movement in relation to the counterpart joint elements 24 of the frame elements 21a, 21b and the joint elements 37b of the lever elements 25a, 25b may inter alia substantially perform likewise a pivoting movement in relation to the guideway elements 23 of the frame elements 21b, 21a, enables bringing together the both frame elements 21a, 21b into contact with each other, again.

Figure 3D:
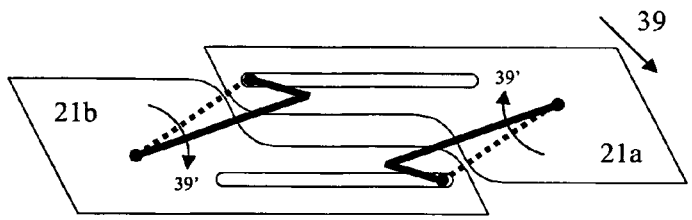
Figure 3D:
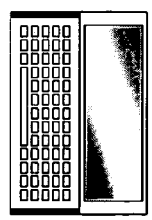

With reference to FIG. 3d, the pivoting of the lever elements 25a and 25b about the respective first joint element 37a engaging pivotably with the joint counterpart element 24 of the respective frame element 21a and 21b and the pivoting of the lever elements 25a and 25b about the respective second joint element 37b pivotably engaging pivotably (and slidably) with the guideway element 23 of the respective frame element 21b and 21a cause a substantially displacing of the first frame element 21a against the second frame element 21b while maintaining orientation of the frame elements 21a, 21b in space, i.e. the orientation of the guideway elements 23 of the frame elements 21a, 21b is substantially maintained this second movement. Therefore, the lever elements 25a and 25b pivot substantially simultaneously about the respective joint elements 37a as well as the respective joint elements 37b engaging with the guideway elements 23 of the frame elements 21a, 21b. Hence, the first frame element 21a substantially shifts in parallel in a direction 39 at the second frame element 21b and in extension direction while the orientation of the frame element 21a is maintained (when e.g. assuming the second frame element 21b as reference). The effective levers 26' are illustrated, which are formed by the joint elements 37a and 37b connected with each other by a substantially straight bar element. However, the structure of the lever elements 25a, 25b may differ from the structure of the effective levers 26' and the present invention should be understood as not being limited to any specific lever structure.

The dual level slide mechanism 20 according to an embodiment of the present invention enables a parallel shift of the first frame element 21a against the second frame element 21b about a shift height. This means the orientation of the guideway element 23, which may be defined by an orientation angle in relation to any reference plane, maintains the same while the shift height in relation to the reference plane may be adjustable upon actuation of the lever mechanism 20. This mechanical behavior of the dual level slide mechanism 20 is illustratively depicted in view of the FIGS. 3c and 3d.

The lever mechanism 20 comprising the two lever elements 25a and 25b in accordance with the embodiment of the invention shown in FIG. 2c enables the aforementioned parallel shift while maintaining the orientation in relation to the reference plane upon actuation of the dual level slide mechanism 20. Further, the embodiment of the dual level slide mechanism 20 as illustrated above implies a longitudinal shift (i.e. a shift in extension direction) in addition to the height shift. This means that when the dual level slide mechanism 20 is actuated to perform a height shift towards a plane defined for instance by a basis of the second frame element 21b (such a height shift should be also designated as downward shift), the first frame element 21a shifts about the longitudinal shift in extension direction. Correspondingly, when the dual level slide mechanism 20 is actuated to perform a height shift away from above defined plane (such a height shift should be also designated as upward shift), the first frame element 21a shifts about a longitudinal shift in extension direction.

The total shift direction is obtained from the superposition of both shift movements, i.e. the height shift and the longitudinal shift, and the superimposed total shift direction is indicated as direction of movement 39, which corresponds to the aforementioned second movement of the first housing element 4 in relation to the second housing element 8. The dual level slide mechanism 20 according to the embodiment described may allow for the second movement in accordance with the inclined faces.

Figure 3E:
Figure 3E:
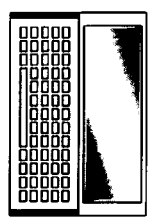

With reference to FIG. 3e, the second pivoting movement 39 is directed substantially at the second frame element 21b and a substantially plane overall surface of the device 2 in extended configuration may obtained according to the measures of the illustrated embodiment such that the uncovered front faces of the housing elements 4, 8 flush with each other and/or the uncovered rear faces of the housing elements 4, 8 flush with each other. The frame elements 21a and 21b are arranged in alignment and partially overlap with each other.

A perspective illustration of the dual level slide mechanism 20 according to an embodiment of the present invention is depicted in FIG. 4a. The mechanism 20 comprises two frame elements 21a and 21b as well as two counterpart frame elements 21a' and 21b'. The frame elements 21a and 21b are substantially axially symmetrical (or rotation symmetrical) in relation to an axis perpendicular to the extension direction. The frame elements 21a, 21b and counterpart frame elements 21a', 21b' are substantially mirror symmetrical in relation to a plane defined by the extension direction.

The lever elements 25a and 25b are arranged interposed between the frame elements 21a, 21b and the counterpart frame elements 21a', 21b', respectively. The joint elements 37a of the lever element 25a engages pivotably with the joint counterpart element 24 of the frame element 21a and the counterpart frame element 21a', whereas the joint elements 37a of the lever element 25b engages pivotably with the joint counterpart element 24 of the frame element 21b and the counterpart frame element 21b'. The joint elements 37b of the lever element 25a engages slidably and pivotably with guideway element 23 of the frame element 21b and the counterpart frame element 21b', whereas the joint elements 37b of the lever element 25b engages slidably and pivotably with guideway element 23 of the frame element 21a and the counterpart frame element 21a'.

The frame elements 21a, 21b and counterpart frame elements 21a', 21b' are mounted at or affixed to each other by the means of the fixture elements 30 and corresponding counterpart fixture elements (not visible in the perspective view shown in FIG. 4a). The affixing of the frame elements 21a, 21b and counterpart frame elements 21a', 21b' should be such that the lever elements 25a, 25b are enabled for pivoting about the joint elements 37a, 37b thereof. Cover elements 22a, 22b may be optionally provided to cover and/or protect the mechanism 20 against influences from exterior.

It should be noted that the lever elements 25a, 25b having joint elements 37a, 37b as described represent merely an embodiment of the present invention. Alternatively, the frame elements 21a, 21b and/or the counterpart frame elements 21a', 21b' may be provide with pin elements (not illustrated) at the position of the joint counterpart elements 24. The lever elements 25a, 25b may be designed to engage with such pin elements as to allowing pivoting about the pin elements. For instance, the lever elements 25a, 25b may be provided with joint ring elements instead of the joint elements 37a.

Moreover, an elastic element 35 such as a spring element may be provided, which may be affixed to the second frame element 21b and to the joint element 37a of the first lever element 25a. The elastic element 35 allows a bistable mechanism 20, where a holding force is caused by the elastic element 35, when the housing configuration is in retracted configuration, and a holding force also is caused by the elastic element 35, when the housing configuration is in extended configuration. For instance, when the housing configuration is in retracted configuration, the holding force exerted by the elastic element 35 onto the first frame element 21a is substantially directed inverse to the extension direction and when the housing configuration is in extended configuration, the holding force exerted by the elastic element 35 onto the first frame element 21a is directed to force the frame elements 21a and 21b against each other. The elastic element 35 may be affixed to the second frame element 21b by the means of a pin element 38 provided, which allows the elastic element 35 is pivot thereabout and/or the elastic element 35 is likewise affixed to the joint element 37a to allow pivoting thereabout.

It should be understood that the first frame element 21a and the first counterpart frame element 21a' form a first part of the mechanism 20 to be operatively mounted at one of the housing elements, e.g. the first housing element 4, whereas the second frame element 21b and the second counterpart frame element 21b' form a second part of the mechanism 20 to be operatively mounted at the other one of the housing elements, e.g. the second housing element 8.

Figure 4B:
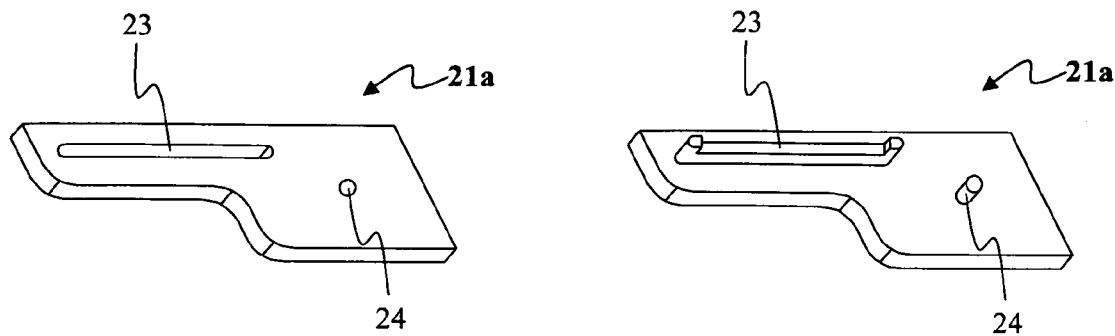
FIGS. 4b to 4d depict schematically exemplary implementation details of a dual level slide mechanism according to further embodiments of the invention in a perspective view.
Figure 4C:
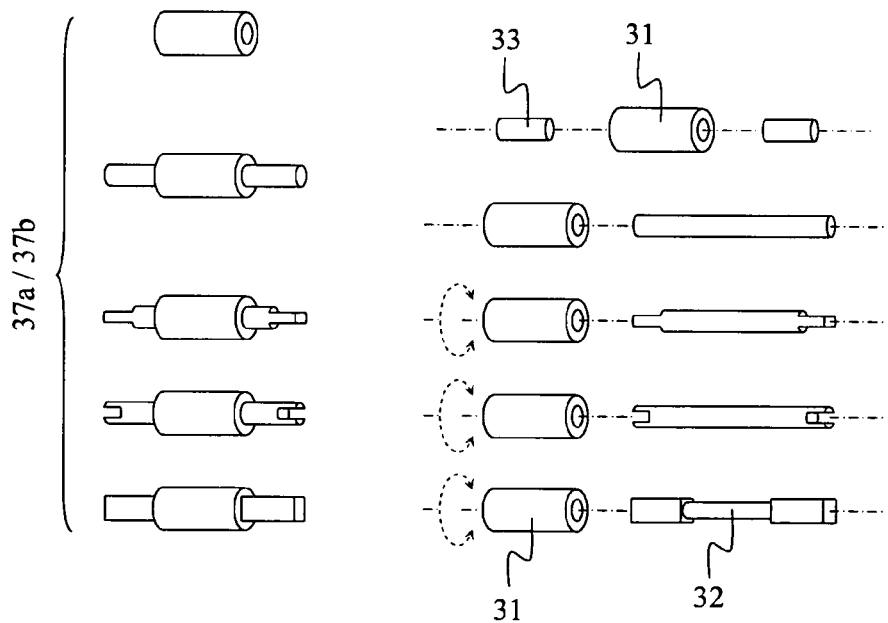

With reference to FIGS. 4b to 4c alternative implementation details are schematically depicted for the way of illustration. Those skilled in the art should understand that the illustrated implementation details should not limit the scope of the present invention to any specifically illustrated implementation. Nevertheless, it should be noted that any combination of details described with reference to any of the embodiments of the present invention may be combined with each other embodiment thereof.

With reference to FIG. 4b, two exemplary embodiments of a first frame element 21a according to the present invention are schematically illustrated in a perspective view. The left-hand side first frame element 21a according to an embodiment of the present invention comprises a guideway element 23 embodied as a groove or slit guideway element. Such a notch, slit, or groove shaped guideway element 23 should be intended for accepting the joint element 37b. The arrangement of the notch, slit, or groove shaped guideway element 23 as well as the joint element 37b is intended for slidable and pivotable engagement with each other. Exemplary embodiments of the joint element 37b, which enables such slidable and pivotable engagement will be described below with reference to FIG. 4c.

The joint counterpart element 24 may comprise a shaft accepting recess element, in particular a recess, a bore and the like, which may be of substantially cylindrical shape. Such a recess shaped joint counterpart element should be intended for accepting the joint element 37a of the lever elements 25a. The arrangement of the recess shaped joint counterpart element 24 as well as the joint element 37a is intended for pivotable engagement with each other. Exemplary embodiments of the joint element 37a, which enables such pivotable engagement will be described below with reference to FIG. 4c.

The right-hand side first frame element 21a according to an embodiment of the present invention comprises a guideway element 23 with a projecting or rail element extending longitudinally. Such a guideway element having a longitudinal extending protection or rail element should be intended for cooperating with the joint element 37b. The arrangement of the projecting shaped guideway element 23 as well as the joint element 37b is intended for slidable and pivotable engagement with each other. Exemplary embodiments of the joint element 37b, which enables such slidable and pivotable engagement will be described below with reference to FIG. 4c.

The joint counterpart element 24 may comprise a shaft or pin element, which may be formed as one piece with the frame element 21a or which may be put into, mounted at, or affixed with the frame elements 21a. Such a shaft or pin comprising joint counterpart element should be intended for accepting the joint element 37a. The arrangement of the recess shaped joint counterpart element 24 as well as the joint element 37a is intended for slidable and pivotable engagement with each other. Exemplary embodiments of the joint element 37a, which enables such slidable and pivotable engagement will be described below with reference to FIG. 4c.

Although, embodiments of the first frame element 21a has been described above only, those skilled in the art will appreciate on the basis of the description of the present invention that the second frame element 21b as well as the counterpart frame elements 21a', 21b' may comprise the same or compatible structural elements aforementioned for the way of illustration.

With reference to FIG. 4c, a selection of exemplary schematic joint elements 37a, 37b, one or more of which may be comprised by the lever element 25a, 25b, is depicted. The different embodiments will be described below from top to bottom.

The first embodiment of FIG. 4c illustrates a joint element 37a, 37b, which comprises a lead-through, a bore or the like, which is for instance adapted to cooperate with a shaft element or a pin element as illustratively depicted in the second embodiment of FIG. 4b. The lead-though or bore of the joint element 37a, 37b may have a substantially circular cross section. Such a joint elements 37a, 37b, which has a substantially cylindrical outer shape for the way of illustration, may engage pivotably with such a shaft or pin element.

The second embodiment of FIG. 4c illustrates a joint element 37a, 37b in one part or in several parts, which includes one or more shaft parts. Such shaft parts are suitable for pivotable engagement with a joint counterpart element 24 and for slidable and pivotable engagement with a notch, groove, or slit shaped guideway element 23 as described with reference to the first embodiment of FIG. 4b. The one or more shaft parts of such a joint element 37a, 37b may be inserted into the body element 32 of the joint element 37a, 37b for instance by the means of one or more plug connections.

The third embodiment of FIG. 4c illustrates a joint element 37a, 37b, which includes tongue parts. The tongue parts may be arranged axially and longitudinally in relation to the body part of the joint element 37a, 37b. Such a joint element may be a one-piece element or may be formed of several parts. For instance, one or more axial parts including the tongue parts may be inserted into the body part having corresponding accepting parts such as a bore. The tongue parts are suitable for engagement with a joint counterpart element 24 and for slidable engagement with a notch, groove, or slit shaped guideway element 23 as described with reference to the first embodiment of FIG. 4b. The pivotability of the joint element 37a, 37b in relation to the joint counterpart element 24 as well as the guideway element 23 may be realized in that the body part engages pivotably with the axial part having the tongue parts at the longitudinal ends thereof.

The fourth embodiment of FIG. 4c illustrates a joint element 37a, 37b, which includes notch or groove parts. The notch or groove parts may be arranged axially and longitudinally in relation to the body part of the joint element 37a, 37b. Such a joint element may be a one-piece element or may be formed of several parts. For instance, one or more axial parts including the notch or groove parts may be inserted into the body part having corresponding accepting parts such as a bore. The notch or groove parts are suitable for engagement with a joint counterpart element 24 having a conforming shape and for slidable engagement with a projecting shaped guideway element 23 as described with reference to the second embodiment of FIG. 4b. The pivotability of the joint element 37a, 37b in relation to the joint counterpart element 24 as well as the guideway element 23 may be realized in that the body part engages pivotably with the axial part having the notch or groove parts at the longitudinal ends thereof.

The fifth embodiment of FIG. 4c illustrates a joint element 37a, 37b, which includes squared parts, in particular cuboid parts. squared parts may be arranged axially and longitudinally in relation to the body part of the joint element 37a, 37b. Such a joint element may be a one-piece element or may be formed of several parts. For instance, one or more axial parts including the squared parts may be inserted into the body part having corresponding accepting parts such as a bore. The squared parts are suitable for engagement with a joint counterpart element 24 having a conformingly shape and for slidable engagement with a notch, groove, or slit shaped guideway element 23 as described with reference to the first embodiment of FIG. 4b. The pivotability of the joint element 37a, 37b in relation to the joint counterpart element 24 as well as the guideway element 23 may be realized in that the body part engages pivotably with the axial part having the squared parts at the longitudinal ends thereof.

Figure 4D:
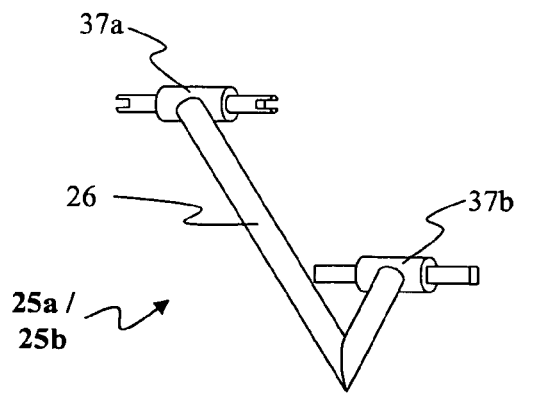

With reference to FIG. 4d, a lever element 25a, 25b is depicted for the way of illustration. The lever element 52a, 25b is includes in principle the joining bar element 26 and the joint elements 37a, 37b, each of which being arranged at one end of the joining bar element 26. The joint elements 37a, 37b may correspond to any of the aforementioned embodiments. The joint element 37a and the joint element 37b may be differently embodied. However, those skilled in the art will appreciates that further embodiments may allow realization of the above described functionality of the lever elements 25a, 25b, one joint element 37a of each engaging pivotably with one of the frame elements 21a, 21b and the other joint element 37b of each engaging slidably and pivotably with the other one or the frame elements 21a, 21b.

Figures 5A, 5B, 5C, 5D:
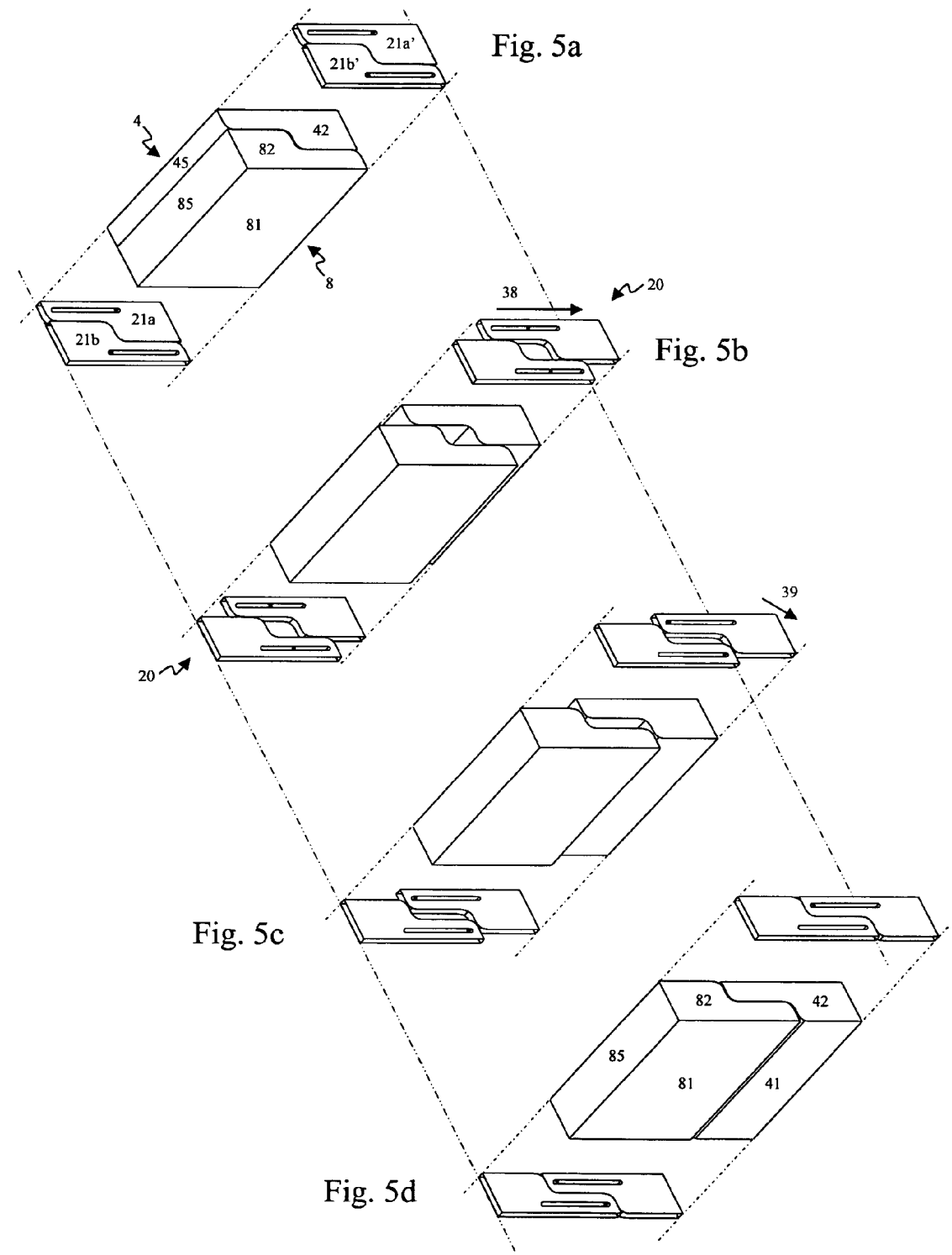
FIG. 5a to 5d show schematically snap-shots plan views of a device housing configuration enabled for extension during operation, housing elements of which device being provided with dual level slide mechanisms according to an embodiment of the present invention.

FIG. 5a illustratively depicts device 2 in retracted configuration in analogy to the side view illustrated in FIG. 1a and described above with reference thereto. The dual level slide mechanisms 20 according to an embodiment of the present invention as illustrated and described above, are exemplarily attached to the side faces of the housing elements 4, 8. That means that a first part of one or the dual level slide mechanisms 20 is mounted at the side face 42 of the first housing element 4, whereas a second part of one of the dual level slide mechanisms 20 is mounted at the side face 82 of the second housing element 8. Moreover, a first part of the other one of the dual level slide mechanisms 20 is mounted at the side face 41 of the first housing element 4, whereas a second part of the other one of the dual level slide mechanisms 20 is mounted at the side face 81 of the second housing element 8. It should be noted that the dual level slide mechanisms 20 may also be arranged integrally and/or internally with the housing elements 4, 8.

The first housing element 4, the side face 42 of which is illustratively shown, substantially covers or overlaps the second housing element 8, the side face 82 of which is illustratively shown. The rear faces 43 and the front face 81 are in conformingly adjoining arrangement.

With regard to FIG. 2b, the first and second housing elements 4 and 8 are slidably mounted on each other such that the elements 4, 8 can be moved, shifted, or slid against each other for instance upon application of an externally exerted force applied to the housing elements and exerting a separating force in extension direction 38. Assuming the second housing element 8 as reference, the first housing element 4 is slidable in the extension direction 38 of the housing of the device 2.

This movement is operable in that the joint elements 37a of the lever elements 25a and 25b move within the guideway elements 23 of the second and first frame elements 21b and 21a (as well as the second and first counterpart frame elements 21b' and 21a'). As aforementioned, the first housing element 4 and the second housing element 8 correspond to a two-step stepladder or a two-step library step in side view. These elements can be placed on top of each other with the steps facing the corresponding bottom as well as top faces of the housing elements 4, 8.

With reference to FIG. 5c, the sliding movement, i.e. the first movement 38, is continued upon application of the (externally exerted and separating) force and ends when the device 2 has substantially reached the maximum extension (expect the length contribution of the inclined bottom face 45, top face 84 and the step faces, respectively). At the end position of the of the first movement, the parts of the housing elements 4 and 8 having less thickness (i.e. the parts having the thickness b4 and b8, respectively, according to the embodiment illustrated) are arranged in a substantially overlapping arrangement but there parts are not in substantially plane contact up to now. The second movement, which according to an embodiment of the present invention may be a shift movement parallel to the inclined bottom face 45, top face 84 and the step faces, respectively, enables bringing together the both housing elements 4, 8 (and especially the aforementioned parts thereof) into substantially (two-dimensional) plane contact with each other, again.

With reference to FIG. 5*d*, the second movement 39 is directed substantially at the second housing element 8 and a substantially plane overall surface of the device 2 in extended configuration may obtained according to the measures of the illustrated embodiment such that the uncovered front faces of the housing elements 4, 8 flush with each other and/or the uncovered rear faces of the housing elements 4, 8 flush with each other. This means that the uncovered parts of the front faces 41 and 81 may be now aligned in a substantially common plane. In accordance with the aforementioned thickness measures of the housing elements 4, 8 according to an embodiment of the invention, the substantially common plane, in which the uncovered parts of the front faces 41 and 81 are arranged, is obtained when the sum of the thicknesses b4 and b8 is equal to the total thickness of the device 2 in extended position. The same may apply to the rear faces 43 and 83.

FIG. 6*a* shows the extendible touch-screen personal digital assistant comprising for instance a full size touch screen display 14 and an earpiece 18 arranged in a centered position over the display. The depicted device is designed e.g. for pen operation.

FIG. 6*b* shows from left-hand to right-hand side the device of FIG. 6*a* being in a fully closed position, a partially closed position (where the second housing element is in extended position, only), and a fully extended position (where both second and third housing elements are in respective extended positions). Due to the configuration and the arrangement of the movable housing elements, the overall width (or length) of the device in the extended position may be approximately 1.5 the width (of the length) of the device in the retracted position (as in the case of FIGS. 1*a* and 1*b*).

Figure 6C:
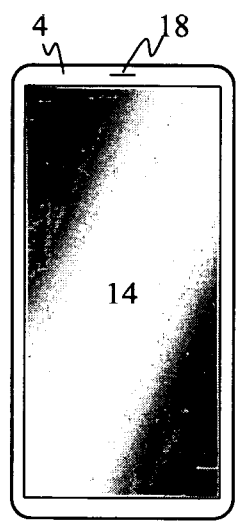
Figure 6C:
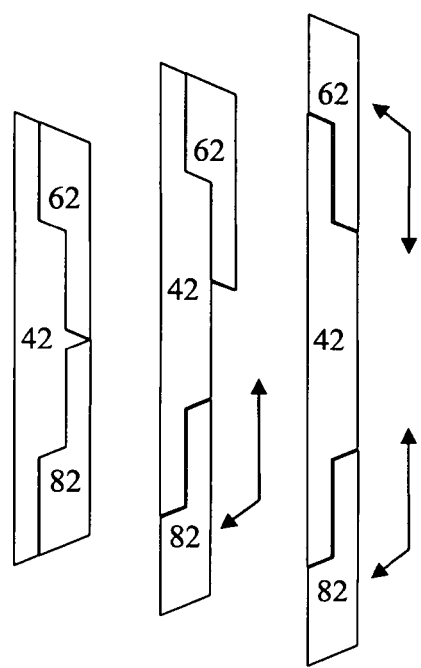
Figure 6C:
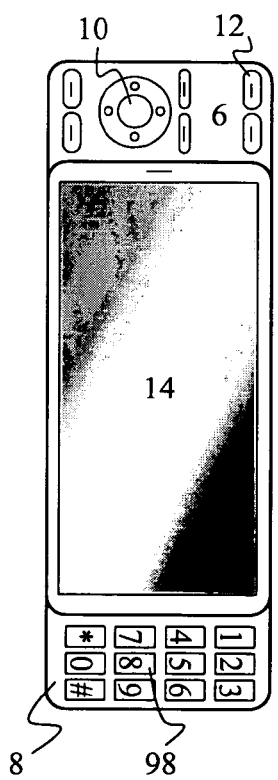
Figure 6C:
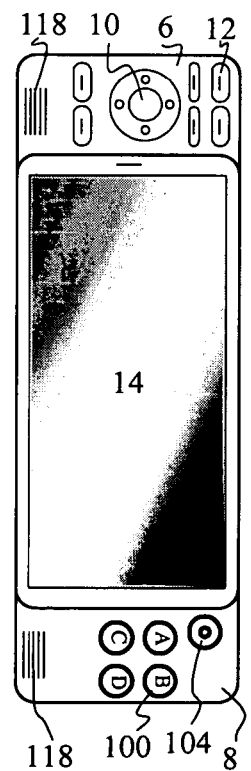

FIG. 6*c* depicts two front views of the device being in the open (extended) position, wherein the embodiment depicted at the left side is embodied as a telephone implementation, and the embodiment depicted at the right side is embodied as a gaming device implementation. The telephone embodiment may comprise a browsing key 10 and some menu keys 12 on the left (third) extended housing element 6, and an ITU-T keyboard 98 on the right (second) extended housing element 8. The gaming device embodiment may comprise a big thumb stick 10 (a thumb operated joystick), some keys 12 on the left extended housing element, and a number of action keys 100, and a small thumb stick 104 (a thumb operated joystick) on the right extended housing element 8. Both extended housing elements 6 and 8 of the gaming device embodiment may be provided with stereo loudspeakers 118 indicated as sound outlets.

It is also envisaged to implement a full QWERTY keyboard on the extendible housing elements (not depicted).

Those skilled in the art will appreciate from the embodiment shown in FIGS. 6*a* to 6*c* that the applicability of the dual level slide mechanism 20 described above in detail is not limited to an upright form factor of the housing as illustrated in FIGS. 1 to 2. The embodiment of FIG. 6 exemplarily illustrates an extendible housing element configuration, which extension direction is transversal to the orientation of the device, in which the device is usually handled. Those skilled in the art will understand that the aforementioned dual level slide mechanisms 20 should have to be oriented in the corresponding (transversal) direction.

FIGS. 7*a* to 7*c* show further embodiment of the present invention by the means of three different implementations of sliding or movable configurations, each depicted in a retracted and in an extended position in side views. In accordance with the embodiment shown in FIG. 7*a*, the first housing element (on the left hand side) has an extended upper section. The second housing element (on the right hand side) has a configuration described above and may be provided with an unlocking button. In this housing arrangement only the retracted configuration has a substantially plane front configuration, while in extended position the rear or front surface has a protrusion in the upper part of the device. This configuration allows different extension ratios between e.g. factors from approximately 1.1 up to 1.5.

The embodiment of FIG. 7*b* illustrates a three-step housing configuration of substantially similar form. This configuration allows achieving an extension ratio of approximately 1.3 with a configuration that allows a parallelepipedal configuration in extended and in retracted position. Another advantage of this configuration is the larger overlapping area allowing a more solid configuration of the extendable connection. This embodiment represents a "three-step" stepladder implementation of the housing arrangement.

The embodiment of FIG. 7*c* illustrates three housing elements 42, 62, 82 allowing a three-step and a two-step configuration. This configuration allows achieving extension ratios above approximately 1.5 up to approximately 2. This configuration further allows at least in the fully retracted position a parallelepipedal shape. Another advantage of this embodiment is a larger overlapping area allowing a more solid configuration of the extendable connection. Only in the fully extended configuration, when the second element is extended, a flat front surface is achieved. In case the third housing element 62 is only extended (not depicted), the front surface of the third housing element 62 is not adjacent and not flushing with the front surface of the first housing element 42.

The description above primarily relates to mechanical aspects of the extendible device housing. However, it should be realized that the extendible device housing being enabled by the means of the configurable housing elements thereof may also have effect on the operability of the mobile/portable electronic device. For the sake of completion, the typical portable/mobile electronic devices are processor-based devices, which operate on the basis of one or more processing units including central processing units (CPUs), mobile processing units (MPUs), and/or micro controllers (μCtrls). Moreover, further components such as a data and/or application storage(s), user interface input/output means including typically audio input and/or output (I/O) means, keys, keypad and/or keyboard with key input controller and a display with display controller are conventionally included. Data communications with external entities is operable by one or more data communication interfaces including for instance a cellular communication transceiver, any (local) wireless and/or wired data interfaces. The implementation and/or operation of a processor-based device is will known in the art.

The operation of such a device is conventionally performed under control of the processing unit and typically on the basis of an operating system or one or more basic controlling applications, which are adapted to control the functions, features, and functionality of the device. In general, such function, features, and functionality of the device are enabled by the means of hardware and/or software components. Such hardware components exemplarily described above are enabled for communication with the processing unit through one or more general and/or specific data communication connections and/or busses (serial or parallel). Software components and data thereof are typically stored in the data and application storage, which may comprise any random access memory (RAM), any a read-only memory (ROM) and/or any combination thereof. It should be noted that several memory technologies are applicable to realize RAM and/or ROM storages. In general, software components include a list of instructions to be executed by the processing unit in consequence of which a processing result may be (audibly and/or visibly) presented to the user and/or one or more other (hardware and/or software) components are controlled and/or instructed to operate. The display and display controller are typically controlled by the processing unit and provide information for the user including especially a user interface (UI) allowing the user to make use of the functions, features and functionality of the device. The keypad and keypad controller are provided to enable the user inputting information. The information input via the keypad is conventionally supplied by the keypad controller to the processing unit, which may be instructed and/or controlled in accordance with the input information.

With reference back to the aspect of the extendible device housing, a sensor adapted for detection of the housing configuration may be provided. The sensor may be a micro switch, a micro button, or any other component, which at least is adapted to supply one or more signals indicating whether the device housing is in retracted or extended configuration.

Such a sensor signal may be processed by the devices and/or applications operable with the device. For instance, the operating system may be configured to inform any application about an actual housing configuration, to start (or stop) one or more applications in consequence on a predetermined signal (i.e. upon detection of the actual device housing being in retracted and/or extended configuration), and/or reconfigure any applications in dependence on the actual housing configuration.

For example, it should be assumed that the device is currently operated in standby mode and in retracted configuration. Upon conversion of the device housing into extended configuration, the operation of the device may reactive on the change of the configuration in that for instance the device operation is transferred to an ready operation state including for instance the start or activation of one or more applications predefined or user-configurable.

For example, the assignment of so-called function keys may depend on the housing configuration. Function keys are keys, by the actuation of which predefined applications may be initiated including for instance recalling of received messages, device profile settings, device operation protocols, contact manager, electronic calendar, and the like. Such assignments may be predefined and/or user-configurable.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the claims accompanying. Consequently various options of implementing the invention as determined by the claims, including equivalent implementations, also belong to the scope of the invention.

What is claimed is:

1. Extendible mobile electronic device, comprising
a device housing having
  at least a first housing element, which comprises a first front surface and a first rear surface, and
  a second housing element, which comprises a second front surface and a second rear surface,
and
one or more level slide mechanisms, each of which comprising
  first and second frame elements each having a guideway element, and
  first and second lever elements, one end of each engaging pivotably with one of said first and second frame elements and the other end of each engaging pivotably and slidably with said guideway element of the other one of said first and second frame elements;
wherein said first frame element is provided for being attached to one of said first and second housing elements and said second frame element is provided for being attached to the other one of said first and second housing elements;
wherein said first housing element and said second housing element are extensibly supported by said level slide mechanisms to each other, such that said first and second housing elements can adopt a retracted configuration and an extended configuration with respect to each other.

2. Device according to claim 1, wherein a conversion of said device housing from said retracted configuration to said extended configuration comprises a first movement of said housing elements substantially in parallel to each other and a second movement of said housing elements approaching each other.

3. Device according to claim 1, wherein said lever elements are enabled for sliding in guidance by said guideway elements allowing said housing elements moving against each other in a direction of extension.

4. Device according to claim 1, wherein said lever elements are enabled for pivoting in relation to said first and second frame elements to allow said housing elements to approach each other by a shifting movement, while in particular substantially maintaining orientations of said housing elements in relation to each other.

5. Device according to claim 1, wherein an orientation of said guideway elements defines a direction of extension of said extendible device housing.

6. Device according to claim 1, wherein one of said level slide mechanisms is arranged at a side of said device housing and another one of said level slide mechanisms is arranged at an opposite side of said device housing, wherein said side and opposite side of said device housing are defined in relation to a direction of extension, wherein said level slide mechanisms are internally and/or externally arranged with said device housing.

7. Device according to claim 1, wherein in said retracted configuration, said first housing element and said second housing element are located substantially on top of each other, said first rear surface conformingly adjoining said second front surface.

8. Device according to claim 1, wherein in said extended configuration, said first housing element is displaced with respect to said second housing element, wherein said first rear surface is partially adjoining said second front surface.

9. Device according to claim 1, wherein in said extended configuration, said first front surface flushes with said second front surface, wherein in particular, said first housing element and second housing element are arranged at a same level, substantially.

10. Device according to claim 1, wherein said first and second frame elements are substantially axial symmetrical to each other.

11. Device according to claim 1, wherein said level slide mechanism further comprises:
first and second counterpart frame elements arranged with said first and second frame elements to interpose said lever elements therebetween.

12. Device according to claim 11, wherein said first and second counterpart frame elements each having a guideway element, wherein one end of each of said first and second lever elements engages pivotably with one of said first and second counterpart frame elements and the other end of each engages pivotably and slidably with said guideway element of the other one of said first and second counterpart frame elements.

13. Device according to claim 1, wherein said first rear and said second front surfaces have a stepped configuration.

14. Device according to claim 13, further comprising:
one or more applications operable with said device; and
a sensor for detecting said configuration of said device housing;
wherein said applications are reactive to a signal supplied by said sensor, which signal indicate said housing configuration.

15. Device according to claim 1, further comprising:
a display arranged on said first front surface,
a user input interface element arranged on said section of said second front surface, and processing means connected to said display and to user input interface element.

16. Device according to claim 1, further being provided with a pawl for locking said housing in said retracted and/or in said extended configuration.

17. Device according to claim 1, further comprising a cellular telephone module enabling for cellular communications.

* * * * *